US008322048B2

(12) United States Patent
Aveni et al.

(10) Patent No.: US 8,322,048 B2
(45) Date of Patent: Dec. 4, 2012

(54) IMPACT-ATTENUATION MEMBERS WITH LATERAL AND SHEAR FORCE STABILITY AND PRODUCTS CONTAINING SUCH MEMBERS

(75) Inventors: Michael A. Aveni, Lake Oswego, OR (US); Patricia L. Smaldone, Portland, OR (US); Fred G. Fagergren, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 93 days.

(21) Appl. No.: 12/825,942

(22) Filed: Jun. 29, 2010

(65) Prior Publication Data

US 2010/0263227 A1 Oct. 21, 2010

Related U.S. Application Data

(62) Division of application No. 11/422,137, filed on Jun. 5, 2006, now Pat. No. 7,757,410.

(51) Int. Cl.
*A43B 13/18* (2006.01)
*A43B 5/00* (2006.01)

(52) U.S. Cl. .................. 36/28; 36/35 R; 36/37

(58) Field of Classification Search .................. 36/25 R, 36/27, 28, 35 R, 37
See application file for complete search history.

(56) References Cited

U.S. PATENT DOCUMENTS

| 2,437,227 | A | 3/1948 | Hall |
| 4,187,620 | A | 2/1980 | Selner |
| 4,342,158 | A | 8/1982 | McMahon et al. |
| 4,492,374 | A | 1/1985 | Lekhtman et al. |
| 4,535,553 | A | 8/1985 | Derderian et al. |
| 4,536,974 | A | 8/1985 | Cohen |
| 4,566,678 | A | 1/1986 | Anderson |
| 4,611,412 | A | 9/1986 | Cohen |
| 4,638,577 | A | 1/1987 | Riggs |
| 4,753,021 | A | 6/1988 | Cohen |
| 4,774,774 | A | 10/1988 | Allen, Jr. |
| 4,815,221 | A | 3/1989 | Diaz |
| 4,843,737 | A | 7/1989 | Vorderer |
| 4,936,030 | A | 6/1990 | Rennex |
| 5,086,574 | A * | 2/1992 | Bacchiocchi .................. 36/35 R |
| 5,205,798 | A | 4/1993 | Lekhtman |
| 5,220,737 | A * | 6/1993 | Edington .......................... 36/28 |

(Continued)

FOREIGN PATENT DOCUMENTS

CA 2279604 A1 2/2001

(Continued)

OTHER PUBLICATIONS

Office Action issued Mar. 15, 2011 in related Chinese Patent Application No. 200780025497.0 and English translation thereof.

(Continued)

*Primary Examiner* — Marie Patterson
(74) *Attorney, Agent, or Firm* — Banner & Witcoff, Ltd.

(57) ABSTRACT

Impact-attenuation members include: (a) an impact-attenuating member and (b) a shear resistant member engaged with the impact-attenuating member. Another example impact-attenuation member includes a shear resistant member having a continuous wall that bulges outward on opposing sides when in an uncompressed base orientation. The shear resistant members may be structured and arranged to allow bending or compression against impact forces in one direction (e.g., when landing a step or a jump), but remain highly stable against shear or lateral forces in another direction (e.g., in a side-to-side direction). Such impact-attenuation members may be used in footwear products, including in athletic footwear.

14 Claims, 9 Drawing Sheets

U.S. PATENT DOCUMENTS

| | | | |
|---|---|---|---|
| 5,224,277 A | | 7/1993 | Sang Do |
| 5,280,890 A | | 1/1994 | Wydra |
| 5,343,639 A | * | 9/1994 | Kilgore et al. .................... 36/29 |
| 5,353,523 A | | 10/1994 | Kilgore et al. |
| 5,353,526 A | | 10/1994 | Foley et al. |
| 5,369,896 A | * | 12/1994 | Frachey et al. .................. 36/29 |
| 5,461,800 A | | 10/1995 | Luthi et al. |
| D376,471 S | | 12/1996 | Kalin et al. |
| 5,643,148 A | | 7/1997 | Naville |
| 5,701,685 A | | 12/1997 | Pezza |
| 5,822,886 A | | 10/1998 | Luthi et al. |
| 5,871,298 A | | 2/1999 | Lekhtman et al. |
| 5,916,071 A | | 6/1999 | Lee |
| 6,061,928 A | * | 5/2000 | Nichols ............................ 36/28 |
| 6,266,897 B1 | | 7/2001 | Seydel et al. |
| 6,282,814 B1 | | 9/2001 | Krafsur et al. |
| D450,437 S | | 11/2001 | Simpson et al. |
| 6,318,001 B1 | | 11/2001 | Lee |
| 6,401,887 B1 | | 6/2002 | Hur |
| 6,457,261 B1 | | 10/2002 | Crary |
| 6,516,540 B2 | | 2/2003 | Seydel et al. |
| 6,530,564 B1 | | 3/2003 | Julien |
| 6,562,427 B2 | | 5/2003 | Hung |
| 6,568,102 B1 | * | 5/2003 | Healy et al. ...................... 36/28 |
| 6,665,957 B2 | | 12/2003 | Levert et al. |
| 6,684,531 B2 | | 2/2004 | Rennex |
| 6,722,670 B1 | | 4/2004 | Lee |
| 6,749,187 B2 | | 6/2004 | Yang |
| 6,807,753 B2 | | 10/2004 | Steszyn et al. |
| 6,851,204 B2 | * | 2/2005 | Aveni et al. ...................... 36/28 |
| 6,880,267 B2 | | 4/2005 | Smaldone et al. |
| 6,886,274 B2 | | 5/2005 | Krafsur et al. |
| 6,898,870 B1 | | 5/2005 | Rohde |
| 6,968,636 B2 | | 11/2005 | Aveni et al. |
| 7,082,698 B2 | | 8/2006 | Smaldone et al. |
| 7,314,125 B2 | * | 1/2008 | Smaldone et al. ............ 188/372 |
| 7,360,324 B2 | * | 4/2008 | Aveni ................................ 36/27 |
| 2004/0049946 A1 | | 3/2004 | Lucas et al. |
| 2004/0128860 A1 | | 7/2004 | Smaldone et al. |
| 2004/0181969 A1 | | 9/2004 | Smaldone et al. |
| 2004/0221483 A1 | | 11/2004 | Cartier et al. |
| 2004/0261292 A1 | | 12/2004 | Aveni et al. |
| 2006/0064900 A1 | | 3/2006 | Aveni |
| 2006/0112592 A1 | | 6/2006 | Leedy et al. |
| 2007/0033830 A1 | * | 2/2007 | Chang ............................... 36/28 |
| 2007/0033831 A1 | | 2/2007 | Aveni |
| 2007/0074423 A1 | | 4/2007 | Goodwin et al. |
| 2007/0256326 A1 | | 11/2007 | Jarvis |
| 2008/0016718 A1 | | 1/2008 | Aveni et al. |
| 2008/0016719 A1 | | 1/2008 | Aveni et al. |

FOREIGN PATENT DOCUMENTS

| | | |
|---|---|---|
| DE | 3048787 A1 | 7/1982 |
| JP | 3195503 | 7/2006 |
| WO | 9520333 | 1/1995 |
| WO | 9609778 | 4/1996 |
| WO | 20050025381 A1 | 3/2005 |

OTHER PUBLICATIONS

International Preliminary Report on Patentability in corresponding PCT Application, International Application No. PCT/US2007/012667, mailed Dec. 24, 2008.

International Search Report in corresponding PCT application, International Application No. PCT/US2007/012667, mailed Nov. 2, 2007.

Internet Printout: http://niketown.nike.com, Nike Shox Turbo, dated May 11, 2004 (3 pages).

International Search Report dated Dec. 16, 2005 in PCT Application No. PCT/US2005/033275.

Office Action issued Sep. 30, 2011 in related Chinese Patent Application No. 200780025497.0 and English translation thereof.

Office Action issued Nov. 23, 2011 in related European Patent Application No. 07777310.9.

* cited by examiner

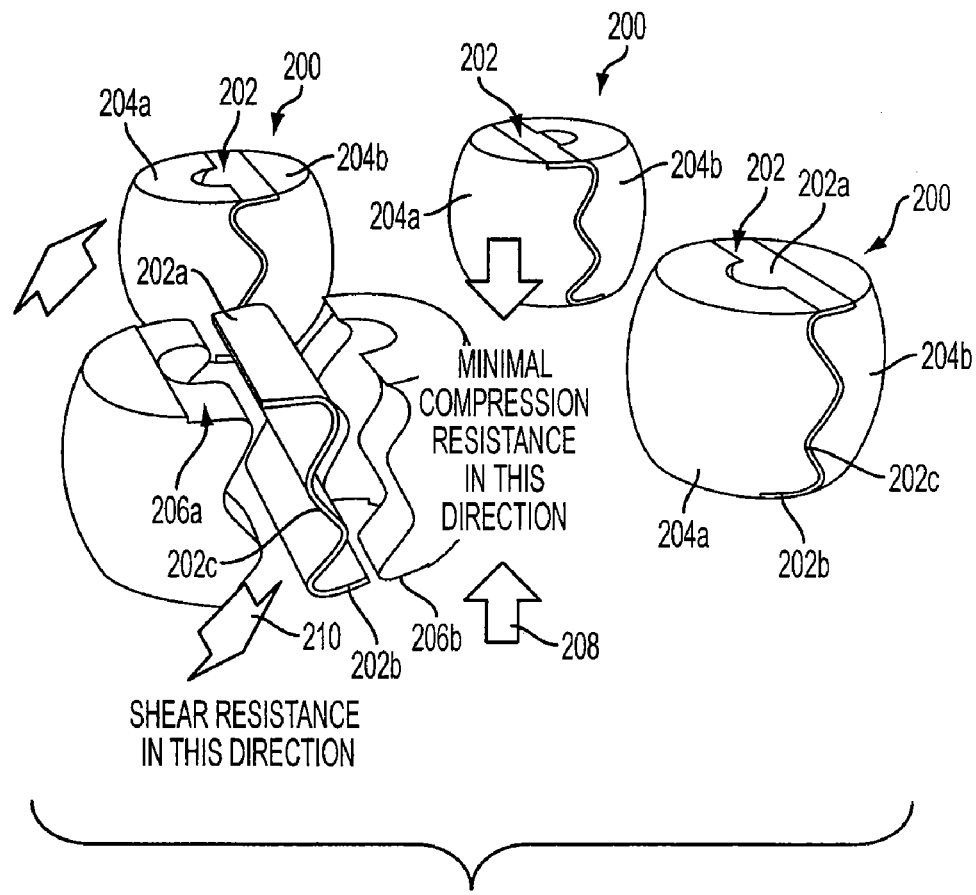
FIG. 2A
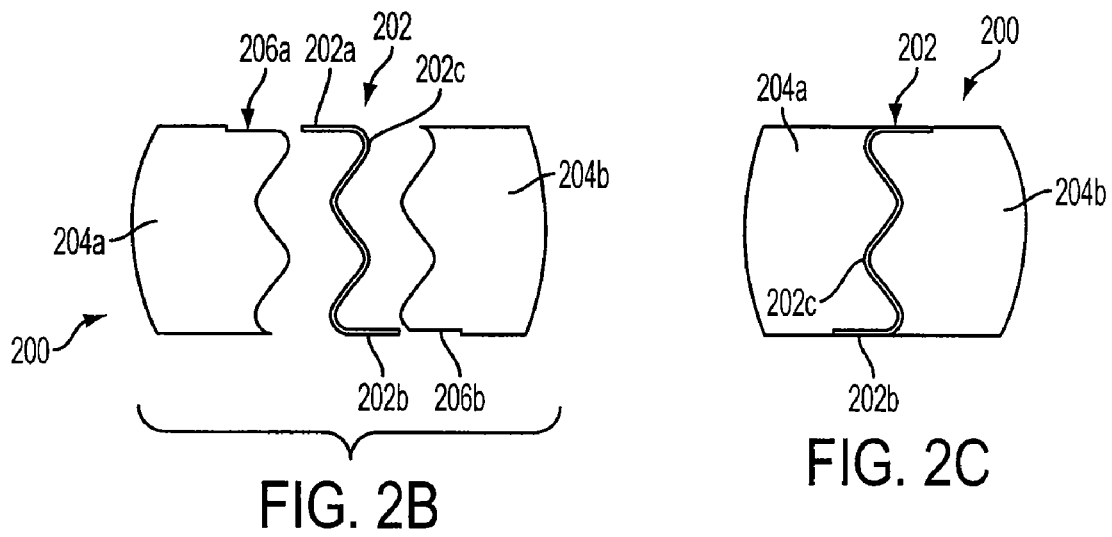
FIG. 2B
FIG. 2C

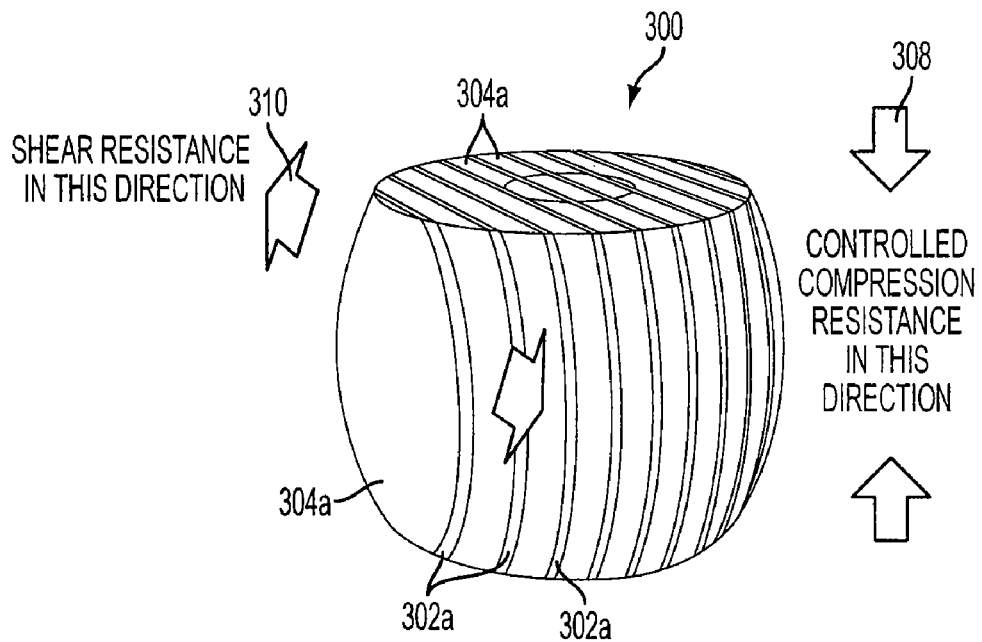
FIG. 3A
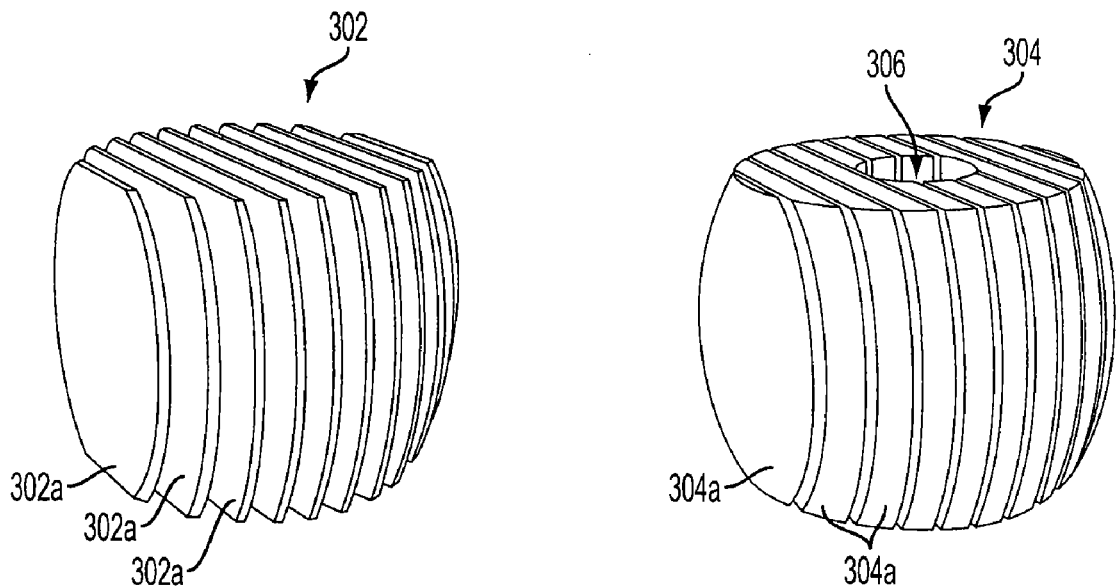
FIG. 3B
FIG. 3C

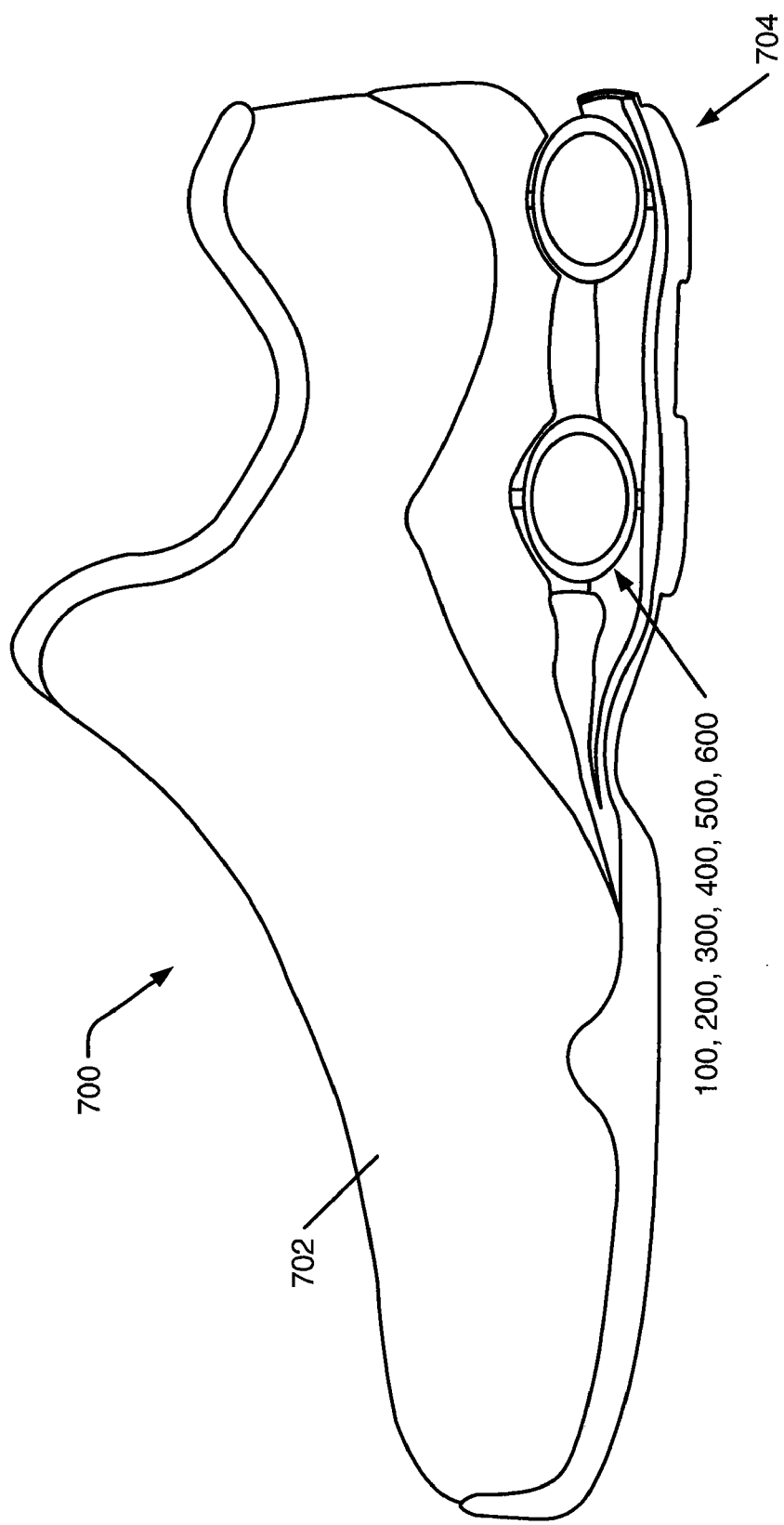

IMPACT-ATTENUATION MEMBERS WITH LATERAL AND SHEAR FORCE STABILITY AND PRODUCTS CONTAINING SUCH MEMBERS

RELATED APPLICATION DATA

This application is a divisional of U.S. Ser. No. 11/422,137, filed Jun. 5, 2006, which relates, at least in part, to the subject matter described in U.S. Pat. No. 7,314,125, issued Jan. 1, 2008, and U.S. Pat. No. 7,458,172, issued Dec. 2, 2008. Each of these patents is entirely incorporated herein by reference.

FIELD OF THE INVENTION

The invention relates generally to impact-attenuation members. Such members may be provided in a wide variety of different products, e.g., in footwear products and other foot-receiving devices, such as in the heel and/or toe areas of footwear or foot-receiving device products.

BACKGROUND

Conventional articles of athletic footwear have included two primary elements, namely an upper member and a sole structure. The upper member provides a covering for the foot that securely receives and positions the foot with respect to the sole structure. In addition, the upper member may have a configuration that protects the foot and provides ventilation, thereby cooling the foot and removing perspiration. The sole structure generally is secured to a lower portion of the upper member and generally is positioned between the foot and the ground. In addition to attenuating ground or other contact surface reaction forces, the sole structure may provide traction and control foot motions, such as pronation. Accordingly, the upper member and sole structure operate cooperatively to provide a comfortable structure that is suited for a variety of ambulatory activities, such as walking and running.

The sole structure of athletic footwear generally exhibits a layered configuration that includes a comfort-enhancing insole, a resilient midsole formed from a polymer foam material, and a ground-contacting outsole that provides both abrasion-resistance and traction. The midsole is the primary sole structure element that attenuates ground reaction forces and controls foot motions. Suitable polymer foam materials for the midsole include ethylvinylacetate or polyurethane that compress resiliently under an applied load to attenuate ground reaction forces.

SUMMARY

Aspects of this invention relate to impact-attenuation members and products in which they are used (such as footwear, other foot-receiving devices, and the like). In at least some examples, impact-attenuation members in accordance with at least some example aspects of this invention may include: (a) an impact-attenuating member (e.g., made of phylon, phylite, polyurethane, or ethylvinylacetate foams); and (b) a shear resistant member engaged with the impact-attenuating member (in some examples, the shear resistant member may include a rigid material (such as a thermoplastic or other plastic material)). The shear resistant member may be designed, structured, and positioned so as to allow bending or compression against impact forces in a first direction (e.g., in the direction of landing a step or a jump, in substantially a vertical direction, etc.) and is stable against shear forces in a second direction different from the first direction (e.g., in a side-to-side direction, in substantially a horizontal direction, etc.). The impact-attenuating member and/or the shear resistant member may be selected and/or oriented so as to provide a desired, controlled degree of bending or compression in the first direction.

Another example impact-attenuation member in accordance with this invention includes a shear resistant member having a continuous wall member that bulges outward on opposing sides when in an uncompressed base orientation. This wall member may define an opening between the opposing sides, wherein the wall member bends against impact forces in a first direction (e.g., in a substantially vertical direction, in the direction of landing a step or jump, etc.) and is stable against shear forces in a second direction different from the first direction (e.g., in a substantial lateral, side-to-side direction, in a substantially horizontal direction, etc.). The wall member may be a rigid material, such as a rigid thermoplastic material or the like. Optionally, if desired, the impact-attenuation member further may include a restraining member at least partially surrounding the shear resistant member, e.g., to limit bending of the wall member in response to the impact forces, to assist in restoring the wall member toward the base orientation after the impact forces are relaxed or removed, to prevent exposure to dirt or debris, etc.

Still other aspects of this invention relate to foot-receiving device products, such as articles of footwear including athletic footwear, that include impact-attenuation members, e.g., of the types described above. Additional aspects of this invention relate to methods of making footwear or other foot-receiving device products including impact-attenuation members in accordance with examples of this invention, as well as to methods of using such foot-receiving device products and/or impact-attenuation members, e.g., for attenuating contact surface reaction forces and providing lateral stability. Such methods may include constructing an article of footwear or other foot-receiving device product to include one or more impact-attenuation members according to the invention between the upper member and the outsole structure (e.g., as part of the sole structure). Once incorporated in the footwear or other product structure, the article of footwear or other product may be used in its known and conventional manner, and the impact-attenuation member will attenuate the ground or contact surface reaction forces (e.g., from landing a step or jump) while also resisting shear or lateral movement or failure of the impact-attenuation member (e.g., during direction changes, cutting actions, quick stops, and the like).

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein:

FIGS. 2A through 2C illustrate another example impact-attenuation member structure in accordance with this invention;

FIGS. 3A through 3C illustrate another example impact-attenuation member structure in accordance with this invention;

FIG. 7 illustrates an example article of footwear structure including plural impact-attenuation members in accordance with an example of this invention.

DETAILED DESCRIPTION

Figure 1A:
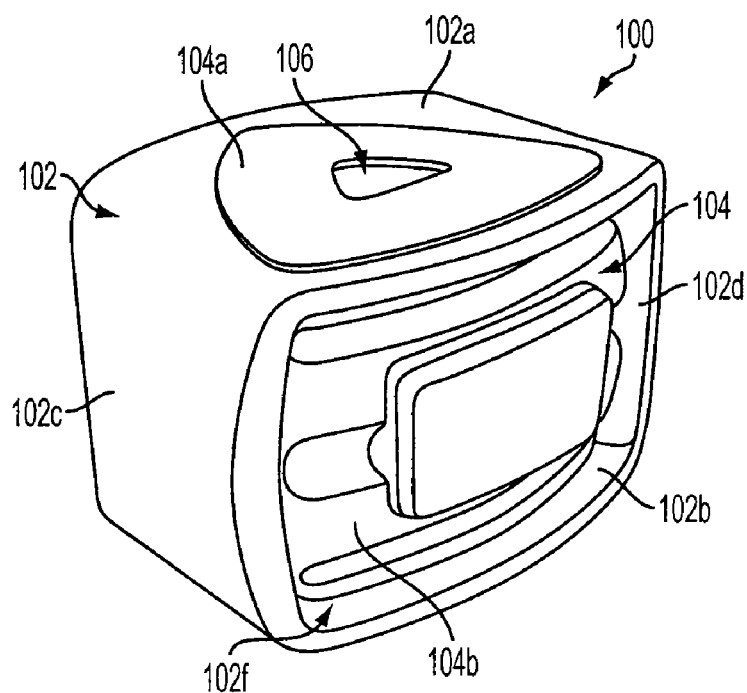
FIGS. 1A through 1D illustrate an example impact-attenuation member structure in accordance with this invention.
Figure 1B:
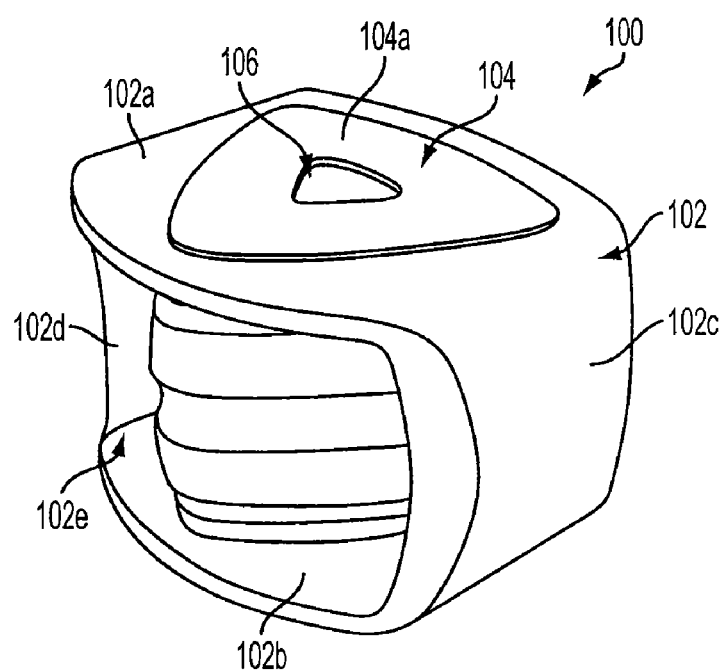
Figure 1C:
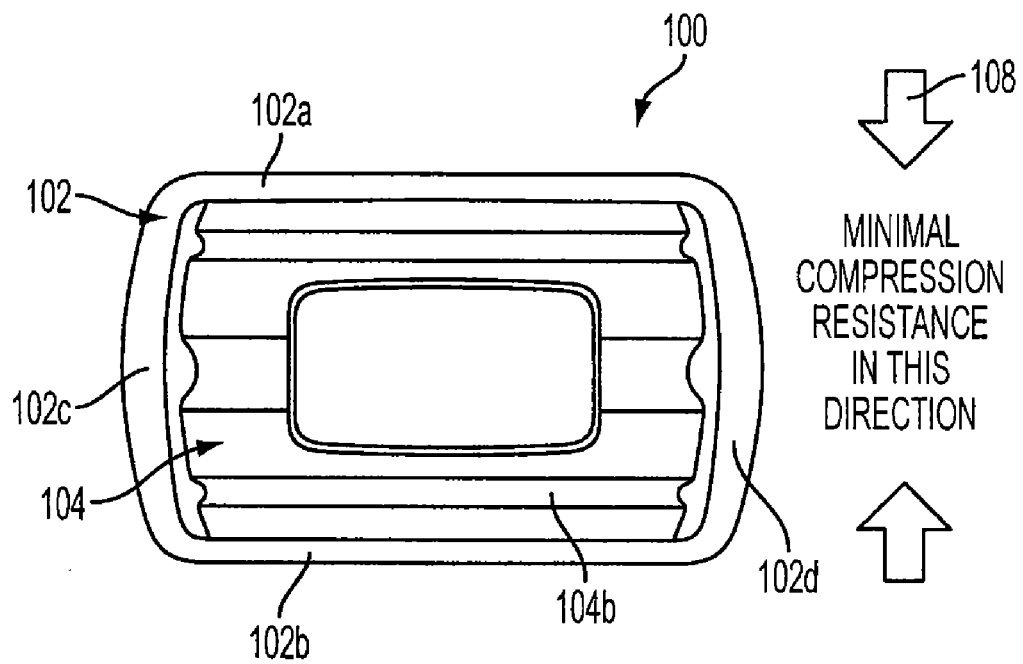

In the following description of various example structures according to the invention, reference is made to the accompanying drawings, which form a part hereof, and in which are shown by way of illustration various example devices, structures, systems, and environments in which aspects of the invention may be practiced. It is to be understood that other specific arrangements of parts, example devices, structures, systems, and environments may be utilized and structural and functional modifications may be made without departing from the scope of the present invention. Also, while the terms "top," "bottom," "side," "front," "rear," "upper," "lower," "vertical," "horizontal," and the like may be used in this specification to describe various example features and elements of the invention, these terms are used herein as a matter of convenience, e.g., based on the example orientations shown in the figures, orientations at rest, and/or orientations during typical use. Nothing in this specification should be construed as requiring a specific three dimensional orientation of structures in order to fall within the scope of this invention.

To assist the reader, this specification is broken into various subsections, as follows: Terms; General Background Relating to the Invention; General Description of Impact-Attenuation Members and Products Containing Them; Specific Examples of the Invention; and Conclusion.

A. Terms

The following terms are used in this specification, and unless otherwise noted or clear from the context, these terms have the meanings provided below.

"Foot-receiving device" means any device into which a user places at least some portion of his or her foot. In addition to all types of footwear (described below), foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like.

"Footwear" means any type of wearing apparel for the feet, and this term includes, but is not limited to: all types of shoes, boots, sneakers, sandals, thongs, flip-flops, mules, scuffs, slippers, sport-specific shoes (such as golf shoes, basketball shoes, tennis shoes, baseball cleats, soccer or football cleats, ski boots, etc.), and the like.

"Foot-covering members" include one or more portions of a foot-receiving device that extend at least partially over and/or at least partially cover at least some portion of the wearer's foot, e.g., so as to assist in holding the foot-receiving device on and/or in place with respect to the wearer's foot. "Foot-covering members" include, but are not limited to, upper members of the types provided in some conventional footwear products.

"Foot-supporting members" include one or more portions of a foot-receiving device that extend at least partially beneath at least some portion of the wearer's foot, e.g., so as to assist in supporting the foot and/or attenuating the reaction forces to which the wearer's foot would be exposed, for example, when stepping down and/or landing a jump in the foot-receiving device. "Foot-supporting members" include, but are not limited to, sole members of the types provided in some conventional footwear products. Such sole members may include conventional outsole, midsole, and/or insole members.

"Contact surface-contacting elements" or "members" include at least some portions of a foot-receiving device structure that contact the ground or any other surface in use, and/or at least some portions of a foot-receiving device structure that engage another element or structure in use. Such "contact surface-contacting elements" may include, for example, but are not limited to, outsole elements provided in some conventional footwear products. "Contact surface-contacting elements" in at least some example structures may be made of suitable and conventional materials to provide long wear, traction, and protect the foot and/or to prevent the remainder of the foot-receiving device structure from wear effects, e.g., when contacting the ground or other surface in use.

B. General Background Relating to the Invention

During many typical athletic activities, such as basketball, cross-training, tennis, soccer, baseball, and the like, athletes will need to quickly move, start, stop, and/or change directions (also commonly referred to as "cutting actions" or making "cuts"). During such activities, the lateral or shear force applied to the bottom unit of a shoe can be many times the athlete's body weight. This force, in at least some instances, can cause the impact-attenuating elements of the shoe (e.g., the midsole foam materials, the impact-attenuating column structures, etc.) to buckle, slide, bend over sideways, and/or otherwise partially continue movement in the direction of the force, which can result in "roll-over" (e.g., it can result in the bottom of the outsole member remaining in contact with the ground while the impact-attenuating material (or at least an upper portion thereof) continues moving, sliding, or rolling over under the applied lateral force) or impact-attenuating column collapse.

Aspects of this invention relate to impact-attenuation members, such as columns, cylinders and other impact-attenuation members, e.g., for the heel or other areas of articles of footwear and other foot-receiving devices, that provide increased stability against these lateral or shear forces. The term "stable against shear forces," as used herein, means that the impact-attenuation member provides resistance against "roll-over" or column collapse, e.g., when the article of footwear (or other device) is used in its intended manner, e.g., for athletic activities, by users of average or typical size and weight. In some more specific examples, the inclusion of the shear resistant member with impact-attenuation members in accordance with this invention (including, for example, the shear resistant member's structure, arrangement, orientation, etc.) will prevent impact-attenuation member roll-over or collapse against shear forces having a magnitude at least 10% greater than the shear forces that would cause roll-over or collapse of a similar impact-attenuation member without the shear resistant member (in other words, the presence of the shear resistant member allows the overall impact-attenuation member structure to withstand at least a 10% greater shear force without roll-over or collapse). In still other examples, the presence of the shear resistant member will allow the overall impact-attenuation member structure to withstand at least a 25% greater shear force, or even a 50%, 75%, 100%, 150%, or 200% greater shear force, without roll-over or collapse, as compared to a similar impact-attenuation member without the shear resistant member.

C. General Description of Impact-Attenuation Members and Products Containing Them In general, aspects of this invention relate to impact-attenuation members, products and systems in which they are used (such as footwear, other foot-receiving devices, heel units, and the like), and methods for including them and using them in such products and systems. These and other aspects and features of the invention are described in more detail below.

1. Impact-Attenuation Members

Impact-attenuation members in accordance with at least some example aspects of this invention provide adequate compression and impact force attenuation in the substantially vertical direction (e.g., in the direction of force application when landing a step or jump) so as not to provide an overly "stiff" feeling article of footwear or other foot-receiving device product, while at the same time also providing sufficient shear force resistance in the lateral direction (e.g., in the direction of force application when making a cut, changing directions, quickly starting or stopping, etc.) so as not to collapse, roll-over, or otherwise fail. Such impact-attenuation members may include, for example: (a) an impact-attenuating member (e.g., made of phylon, phylite, polyurethane, or ethylvinylacetate foams); and (b) a shear resistant member engaged with the impact-attenuating member (in some examples, the shear resistant member may include a rigid plastic material (such as a thermoplastic material)). The shear resistant member may be designed, structured, and positioned so as to allow bending or compression against impact forces in a first direction (e.g., in the direction of landing a step or a jump, in substantially the vertical direction, etc.) and is stable against shear forces in a second direction different from the first direction (e.g., in a side-to-side direction, in substantially the horizontal direction, etc.). This may be accomplished, for example, by arranging at least a portion of a major surface of the shear resistant member to extend in an expected direction of the shear or lateral force. If desired, the shear resistant member may at least partially contain or substantially surround the impact-attenuating member, or alternatively, the impact-attenuating member may at least partially contain or substantially surround the shear resistant member. The impact-attenuating member and/or the shear resistant member may be selected and/or oriented so as to provide a desired, controlled degree of bending or compression in the first direction. The overall impact-attenuation member may have a columnar or cylindrical structure, in accordance with at least some examples of this invention.

A wide variety of impact-attenuation member structures are possible without departing from this invention. For example, in accordance with at least some structures according to the invention, the shear resistant member may form a "box" or "frame" type structure (e.g., a substantially cubic rectangular structure) in which the impact-attenuating member is located. As a more specific example, the box structure may include a first wall (e.g., a top wall), a second wall opposite the first wall (e.g., a bottom wall), a third wall extending from the first wall to the second wall (e.g., optionally having a major surface extending substantially parallel to an expected direction of shear force), and a fourth wall opposite the third wall and extending from the first wall to the second wall. The other opposing sides of the box structure may remain open (e.g., to better allow bending or compressing of the shear resistant element structure in the first direction, i.e., the expected direction of impact forces). If desired, in an unbent or uncompressed condition (also referred to as a "base orientation" in this specification), the impact-attenuating member may contact, attach to, and/or otherwise engage the first wall and/or the second wall of the box structure, but optionally, it need not contact, attach to, and/or otherwise engage the third wall and/or the fourth wall (although it may do so, if desired, in some structures). The impact-attenuating member, in at least some example structures, may be substantially triangular shaped.

Another example impact-attenuation member structure in accordance with some examples of this invention includes a shear resistant member having a first end, a second end opposite the first end, and a zigzag wall member or other collapsible wall member structure extending between the first end and the second end. The impact-attenuation member in such structures may include a first impact-attenuating element provided on a first side of the zigzag or collapsible wall member and a second impact-attenuating element provided on a second side of the zigzag wall or collapsible wall member. The zigzag wall member may extend in substantially the first direction so as to allow the impact forces to compress the wall member about the zigzag structures. Of course, other collapsible structures are possible without departing from the invention, including, for example, wall members having independent portions that are slidable with respect to one another so as to collapse somewhat when exposed to impact forces; a pre-curved wall member; a pre-bent wall member; a wall member with pre-incorporated bend or "fail" lines; etc.

As still another example impact-attenuation member structure in accordance with this invention, the shear resistant member and/or the impact-attenuating member may constitute a plurality of slat members, optionally arranged in an alternating structure (e.g., impact-attenuating material slat, shear resistant member slat, impact-attenuating material slat, shear resistant member slat, etc., arranged parallel to one another). If desired, either or both of the shear resistant member or the impact-attenuating member may include a base surface from which plural slat elements extend. Also, if desired, in at least some structures, the shear resistant member slat elements may be thinner than the impact-attenuating member slats (e.g., to better promote bending of the shear resistant member slats in response to impact forces). As still another option, if desired, the slat elements may be curved, pre-bent, zigzag, or otherwise structured so as to better promote a desired degree of bending or collapse in response to impact forces.

Another example impact-attenuation member structure in accordance with this invention includes a shear resistant member having a central region (e.g., a "hub" region) with plural vanes or spokes extending from the central region. Portions of the impact-attenuating member may be arranged between the vanes of the shear resistant member. In at least some examples, the shear resistant member may have an "X" structure, and it may be arranged such that the impact forces (e.g., from landing a step or jump) are incident between branches of the structure and are attenuated due to flexibility of the arms of the X structure at the central region.

In yet another example impact-attenuation member structure in accordance with this invention, the shear resistant member may be made compressible by providing it in multiple parts arranged in a "telescoping" or otherwise collapsible manner. As a more specific example, such shear resistant members may include at least: (a) a first shear resistant element having a first base member and a first extending member extending from the first base member, and (b) a second shear resistant element having a second base member and a second extending member extending from the second base member, and (c) at least a portion of the impact-attenuating member arranged between the first base member and the second base member (and surrounding the first extending member). The base members may be arranged substantially parallel to one another, and the various extending members may be sized and positioned such that one extending member extends at least partially into another extending member at least when the impact-attenuation member is bent or compressed (e.g., in a telescoping manner) and optionally when it is in an unbent or uncompressed condition. If desired, the extending members may extend in substantially the expected direction of the impact forces and may be arranged such that they further "telescope" within one another when impact forces are applied. Of course, any desired number of shear resistant members and/or extending member fitting structures or schemes may be used without departing from the invention.

Another example impact-attenuation member in accordance with this invention includes a single element that provides both shear resistance and impact attenuation properties. Such impact-attenuation members may include a shear resistant member having a continuous wall member that bulges outward on opposing sides when in an uncompressed base orientation. This wall member may define an opening or through hole between the opposing sides, wherein the wall member bends against impact forces in a first direction (e.g., a substantially vertical direction, from landing a step and/or jump, etc.) and is stable against shear forces in a second direction different from the first direction (e.g., in a substantial lateral, side-to-side, and/or horizontal direction). In some more specific examples, the wall member may be a rigid material, such as a rigid thermoplastic material or the like. Optionally, if desired, the impact-attenuation member further may include a restraining member at least partially surrounding the shear resistant member, e.g., to limit bending of the wall member in response to the impact forces, to assist in restoring the wall member toward the base orientation after the impact forces are relaxed or removed, to prevent exposure to dirt or debris, etc. In at least some examples, the wall member may be substantially spherically or ellipsoidally shaped, optionally with a first truncated side and a second truncated side, wherein the first and second truncated sides provide access to the opening (and optionally a through hole completely through the wall member) and/or access to the hollow interior of the wall sphere or ellipsoid. Also, in at least some examples of this invention, the shear resistant member and/or the overall impact-attenuation member may consist of or consist essentially of the wall member.

2. Foot-Receiving Device Products Including Impact-Attenuation Members and Methods of Making and Using Such Products Additional aspects of this invention relate to foot-receiving device products, such as articles of footwear (including athletic footwear), that include impact-attenuation members, e.g., of the types described above. As a more specific example, foot-receiving device products, such as articles of footwear, in accordance with at least some examples of this invention may include: (a) a foot-covering member (such as an upper member); and (b) a foot-supporting member (such as a sole structure or a portion of a sole structure) engaged with the foot-covering member. The foot-supporting member in accordance with at least some examples of this invention may include one or more impact-attenuation members having: (i) an impact-attenuating member; and (ii) a shear resistant member engaged with the impact-attenuating member, wherein the shear resistant member allows bending or compression against impact forces in a substantially vertical, step landing and/or jump landing direction and is stable against shear forces in a substantially lateral direction (e.g., in a direction from the medial side to the lateral side of the foot and vice versa, in the substantially horizontal direction, etc.).

As another example, the impact-attenuation member(s) may include: (i) a shear resistant member that includes a continuous wall member that bulges outward on opposing sides when in an uncompressed base orientation, the wall member defining an opening between the opposing sides, wherein the wall member bends against impact forces in a substantially vertical, step landing, and/or jump landing direction and is stable against shear forces in a substantially lateral direction (e.g., in a direction from the medial side to the lateral side of the foot and vice versa, in the substantially horizontal direction, etc.); and, optionally, (ii) a restraining member at least partially surrounding the shear resistant member.

Of course, the impact-attenuation members included in footwear and other foot-receiving device products in accordance with this aspect of the invention may have any desired structure and configuration, including the various structures and configurations described in more detail above (and those described in more detail below). Additionally, the overall footwear and other foot-receiving device products may have any desired construction or configuration, including upper members and/or sole structures having conventional constructions and configurations that are known and used in the art. In some more specific examples according to this invention, impact-attenuation members according to examples of this invention may be included in footwear products at locations and orientations similar to those used in conventional footwear products available from NIKE, Inc. of Beaverton, Oreg., e.g., under the "SHOX" brand trademark, e.g., such that the impact-attenuation members are at least partially visible in the final product configuration. Alternatively, if desired, the impact-attenuation member(s) may be hidden or at least partially hidden in the overall footwear or foot-receiving device structure, such as within the foam material of a midsole element, within a gas-filled bladder member, etc. Also, any number of individual impact-attenuation members may be included in an article of footwear or other foot-receiving device product without departing from this invention.

Still additional aspects of this invention relate to methods of making footwear products including impact-attenuation members in accordance with examples of this invention and methods of using such impact-attenuation members and/or such footwear products, e.g., for attenuating contact surface impact or reaction forces. Such methods may include constructing an article of footwear or other foot-receiving device product, e.g., by any desired method, including conventional methods that are known and used in the art, wherein one or more impact-attenuation member according to the invention is incorporated into the footwear or other product structure (e.g., as a portion of a sole member, in the heel or toe area of the article of footwear, etc.). Once incorporated in the footwear or other product structure, the article of footwear or other product may be used in its known and conventional manner, and the impact-attenuation member will attenuate the ground reaction forces (e.g., from landing a step or jump) while also resisting shear or lateral forces and/or movement or collapse of the impact-attenuation member and providing shear or lateral stability (e.g., during direction changes, cutting actions, starting and/or stopping actions, and the like).

Specific examples of structures according to the invention are described in more detail below. The reader should understand that these specific examples are set forth merely to illustrate examples of the invention, and they should not be construed as limiting the invention.

D. Specific Examples of the Invention

The various figures in this application illustrate examples of impact-attenuation members, as well as products and methods according to examples of this invention. When the same reference number appears in more than one drawing, that reference number is used consistently in this specification and the drawings to refer to the same or similar parts throughout. In the description above and that which follows, various connections and/or engagements are set forth between elements in the overall structures. The reader should understand that these connections and/or engagements in general and, unless specified otherwise, may be direct or indirect and that this specification is not intended to be limiting in this respect.

1. Caged or Box Type Impact-Attenuation Members

FIGS. 1A through 1D illustrate an example impact-attenuation member 100 having a "box" or "caged" type structure. As illustrated, the impact-attenuation member 100 includes a shear resistant outer frame structure 102. While any desired frame structure 102 shape may be used without departing from this invention, in this illustrated example, the frame structure 102 is a substantially rectangular cubic or "box" type shape (with gently curved, outwardly bowed side edges). The frame structure 102 includes a top wall 102a, a bottom wall 102b, two opposing side walls 102c and 102d, and two open, opposing sides 102e and 102f. The frame 102 defines a through hole or hollow structure between the walls 102a through 102d. Inside the frame structure 102, an impact-attenuating member 104 is provided. This impact-attenuating member 104 may be of any desired shape without departing from the invention. In this illustrated example, the impact-attenuating member 104 is substantially triangular cylinder shaped (with gently curved, outwardly bowed side edges).

The various parts of this example impact-attenuation member 100 may be made of any desired materials without departing from this invention. For example, the impact-attenuating member 104 may be made of any desired impact-attenuating material, such as rubber (natural or synthetic), polymeric materials (e.g., polyurethane, ethylvinylacetate, phylon, phylite, foams, etc.), and the like, including impact-attenuating materials of the types used in conventional midsole structures, impact-attenuating columns, and/or footwear constructions. The frame structure 102 may be made from a rigid but flexible or bendable material, such as rigid plastic materials like thermoplastic materials, thermosetting materials, polyurethanes, and other rigid polymeric materials, etc., including hard plastic or other materials conventionally used in sole structures, footwear, and/or other foot-receiving device structures. As one more specific example, the frame structure 102 may be made from a PEBAX® material (e.g., a polyether-block co-polyamide polymer commercially available from Atofina Corporation of Puteaux, France).

Various other example structural features of the impact-attenuation member 100 may be seen in FIGS. 1A through 1D. For example, in this illustrated example structure 100, the impact-attenuating member 104 completely fills the frame structure 102 in the vertical (or expected incident impact force) direction (i.e., from top wall 102a to bottom wall 102b), but it optionally leaves a relatively small, unfilled gap along the side edges (i.e., between the impact-attenuating member 104 and the side walls 102c and 102d). If desired, the impact-attenuating member 104 may be secured to the frame structure 102 (e.g., to the top wall 102a and/or the bottom wall 102b) in any desired manner, such as using mechanical connectors, adhesives, cements, friction fit, fusing techniques, a restraining member, or the like. In this illustrated example, a top perimeter or surface portion 104a of the impact-attenuating member 104 fits into an opening 106 or other retaining structure provided in the top wall 102a. This top perimeter or surface portion 104a may be fixed in the opening 106 (or other structure), if desired, by adhesives or cements, mechanical connectors, friction fit, fusing techniques, etc. Also, if desired, a similar (or different) securing system may be provided at the bottom of the impact-attenuating member 104 and/or with the bottom wall 102b of the frame structure 102. As another example, if desired, the opening 106 may be omitted, and the impact-attenuating member 104 may be fixed to the inside surface of the top wall 102a and/or bottom wall 102b (e.g., by adhesives, etc.), it may fit into grooves, recesses, or other structures provided inside the frame structure 102, etc. If desired, a restraining member (like that described in more detail in conjunction with FIG. 6) may be used to at least partially surround or enclose the impact-attenuation member 100.

While the impact-attenuation member 100 may be mounted in an article of footwear or other foot-receiving device structure in any desired manner without departing from this invention, in this illustrated example structure 100, the impact-attenuation member 100 may be mounted such that the side walls 102c and 102d extend substantially in the lateral, side-to-side direction of the article of footwear (e.g., such that a horizontal line parallel to and located on the surface of the wall member 102c or 102d runs substantially parallel to the side-to-side direction of the article of footwear to which it is mounted and/or substantially parallel to an expected direction of lateral or shear force to which the footwear would be exposed, e.g., during a cutting action, during a rapid direction change, during a quick stopping action, etc.). In other words, in this illustrated example structure 100, the triangular point of the impact-attenuating member 104 that points out the open side 102e also will point to the lateral or medial side of the shoe structure (and optionally toward the interior of the shoe, e.g., of the heel area, such that the broad side 104b of the impact-attenuating member 104 faces outward).

The above described structure and arrangement of the impact-attenuation member 100 in a footwear structure can provide various advantageous features. For example, in the structure and arrangement described above, the open sides 102e and 102f of the frame structure 102 will allow the top wall 102a and bottom wall 102b of the frame structure 102 to deflect and move toward one another under a compressive force 108 (e.g., when a wearer lands a step or jump—see FIG. 1C). The rigidity of the frame structure 102 and the density of the impact-attenuating material 104 may be selected such that the overall structure 100 provides a controlled, desired degree of compression in the substantially vertical direction. If desired, the impact-attenuating member 104 may include a through-hole, blind hole, opening, or hollow structure, e.g., to allow gas to escape from the material and compression when compressive forces are applied to it. The gaps between the impact-attenuating member 104 and the side walls 102c and 102d (as described above) also help keep the frame structure 102 out of the impact-attenuating member 104's way during its compression, such that its compression is not substantially impeded or restricted. Also, if desired, the various features and characteristics of the frame structure 102 (e.g., plastic rigidity, thickness, length, width, height, wall curvature, wall sizes, etc.) may be selected to control its resistance to deflection and compression in the vertical direction (e.g., if desired, to provide minimal compression resistance in the vertical direction, and to allow the impact-attenuating member 104 to perform the majority of the impact-attenuating functions).

Figure 1D:
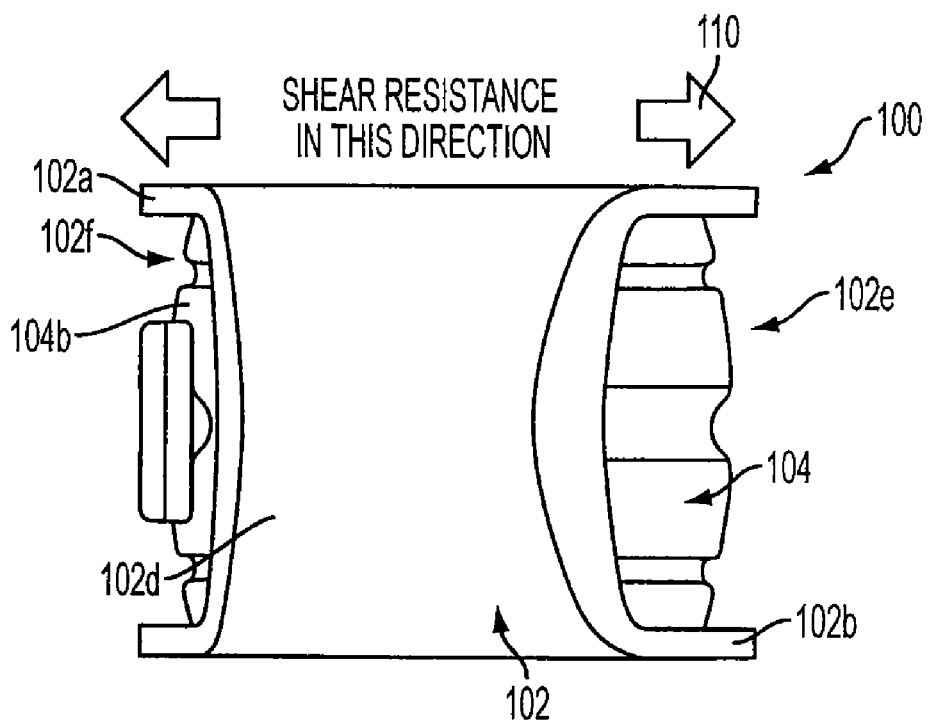

Despite its readily controllable compressibility and its ability to compress in the vertical direction (e.g., due, at least in part, to the open ends 102e and 102f of frame structure 102), this overall structure 100 is laterally stable and resistant to shear forces and to collapse or other failure from shear forces, e.g., in the horizontal, side-to-side direction (in the lateral-to-medial side direction or vice versa), due, at least in part, to the presence of the side walls 102c and 102d and their arrangement in a direction substantially parallel to the shear force incident direction 110 (see FIG. 1D). More specifically, the side walls 102c and 102d provide strong structures that resist collapse or movement when forces in opposing horizontal directions are applied at the top and bottom of the side wall structures 102c and 102d, e.g., when a wearer stops quickly, makes a cutting action, changes directions, etc.

Because the impact-attenuating member 104 need not also perform shear resistant functions in this illustrated structure 100, the size, shape, and materials of the impact-attenuating member 104 may be freely selected so as to provide the desired degree of impact-attenuation (optionally in combination with impact attenuation provided by the frame member 102, if any). Therefore, one does not have to provide an overly "stiff" impact-attenuating column to provide both the desired degree of lateral stability and shear force resistance. Rather, an impact-attenuation member 100 having a desired degree of "softness" can be produced without sacrificing lateral stability and/or shear force resistance.

Also, if desired, one or more impact-attenuation members 100 may be attached to one or more external elements, such as base plate structures or other footwear or foot-receiving device members, e.g., so as to provide a "heel" unit or "heel cage" that may be incorporated into an article of footwear or other foot-receiving device product. If desired, the exterior of the frame structure 102 and/or the impact-attenuating member 104 may include structures that assist with securing the overall member 100 to these external elements, such as grooves, extending surfaces, retaining walls, openings, slots, mechanical connectors, and the like. As mentioned above, impact-attenuation members 100 of this type may be provided and used in the manner that columns are provided and used in conventional footwear products, such as conventional footwear products available from NIKE, Inc. of Beaverton, Oreg. under the "SHOX" brand trademark.

2. Impact-Attenuation Members Having a Collapsible Shear Resistant Wall Member

FIGS. 2A through 2C illustrate another example impact-attenuation member 200 in accordance with this invention. In this example structure 200, an interior shear resistant wall member 202 is provided that is embedded in or surrounded by one or more impact-attenuating members (a single wall member 202 centrally located between two independent impact-attenuating member portions 204a and 204b is shown in the illustrated example of FIGS. 2A through 2C). If desired, as shown in FIGS. 2A through 2C, the wall member 202 may include an expanded top surface 202a and an expanded bottom surface 202b, and optionally, these expanded surfaces 202a and/or 202b may extend in one (or optionally more) directions from the vertical wall portion 202c and along the top and bottom, respectively, of the column structure 200. These expanded surfaces 202a and 202b may fit into (and optionally cemented to) recessed areas 206a and 206b provided in the top and/or bottom of the impact-attenuating member portions 204a and 204b, so as to provide an overall relatively smooth, flush surface when fit together and to further enhance shear resistance. Note FIGS. 2B and 2C. These top and bottom surfaces 202a and 202b, respectively, may cover as much of the top and bottom portions of the columnar impact-attenuation member structure 200 as desired, and optionally, they may include one or more openings defined therein, e.g., to allow for release of gas from the impact-attenuating member portions 204a and 204b during compression thereof. The overall impact-attenuation member 200 may be fit and held together in any desired manner without departing from this invention, including through the use of cements, adhesives, mechanical connectors, fusing techniques, restraining members, and the like. Of course, if desired, multiple shear resistant wall members (e.g., like wall member 202) may be provided in the overall structure 200 without departing from this invention.

The shear resistant wall member 202 may be made from any desired materials without departing from this invention, including the various materials described above for use with the frame structure 102. Likewise, the impact-attenuating member portions 204a and 204b may be made from any desired materials without departing from the invention, including the same or different materials, and including the various materials described above for impact-attenuating material 104. If desired, at least a portion of one of the impact-attenuating member portions 204a and/or 204b may be at least partially hollowed out, e.g., to allow room for compression, gas release, and/or wall member 202 deflection or movement during compression of the columnar structure 200.

The above described structure and arrangement of the impact-attenuation member 200 can provide various advantageous features. For example, in the structure and arrangement described above, the zigzag structure of the wall member 202 will allow the top surface 202a and bottom surface 202b of the wall member 202 to relatively move toward one another under a compressive force 208 (e.g., when a wearer lands a step or jump—see FIG. 2A) in a uniform and repeatable manner. The rigidity of the wall member 202 and/or the density of the impact-attenuating member portions 204a and 204b may be selected such that the overall structure 200 provides a controlled, desired degree of compression in the substantially vertical or landing direction. Because of its zigzag structure, the wall member 202 can be made to relatively freely collapse under compressive force, but it also can be made so as to substantially return to its original shape and orientation once the force is released or relaxed. Also, if desired, the various features and characteristics of the wall member 202 (e.g., plastic rigidity, thickness, length, width, height, numbers of zigzags, the presence of openings, etc.) may be selected to control its resistance to deformation and compression in the vertical or landing direction (e.g., to provide minimal compression resistance in the vertical or landing direction, if desired, and to allow the impact-attenuating member portions 204a and 204b to perform the majority or substantially all of the impact-attenuating functions).

Despite its readily controllable compressibility and its ability to readily compress in the vertical or landing direction (e.g., due, at least in part, to the zigzag structure of wall member 202), this overall structure 200 is resistant to shear forces and to collapse or other failure from shear forces, e.g., in the horizontal, side-to-side direction (in the lateral-to-medial side direction or vice versa) due, at least in part, to the presence of the major wall portion 202c and its arrangement in a direction substantially parallel to the shear force incident direction 210 (see FIG. 2A). More specifically, the major wall portion 202c provides a strong structure that resists collapse, deformation, or movement when forces in different directions are applied at its top and bottom, e.g., when a wearer stops quickly, makes a cutting action, changes directions, etc.

Because the impact-attenuating member portions 204a and 204b need not perform shear resistant functions in this illustrated structure 200, the size, shape, and materials of the impact-attenuating member portions 204a and 204b may be freely selected so as to provide the desired degree of impact-attenuation. Therefore, one does not have to provide an overly "stiff" column to provide both the desired degree of lateral stability and shear force resistance. Rather, an impact-attenuation member 200 having a desired degree of "softness" can be produced without sacrificing lateral stability and shear force resistance.

Of course, other ways of providing a "collapsible" wall member are possible without departing from this invention. For example, if desired, the shear resistant wall member could be curved rather than zigzag structured. As another example, if desired, pre-bent lines or "fail" lines could be provided in a wall member structure to better allow the wall member to collapse in the vertical direction. As still another example, if desired, a multi-part wall member 202 may be provided, optionally spring biased to the uncompressed orientation, in which one portion of the wall member slides, rotates, or otherwise moves with respect to another part of the wall member to thereby provide a collapsing structure. Also, if desired, a single impact-attenuation member 200 may include multiple shear resistant wall members, e.g., zigzag or otherwise structured.

Also, if desired, one or more impact-attenuation members 200 may be attached to one or more external elements, such as base plate structures or other footwear or foot-receiving device member structures e.g., so as to provide a "heel" unit or "heel cage" that may be incorporated into an article of footwear or other foot-receiving device product (note the arrangement of plural impact-attenuation members 200 shown in FIG. 2A). If desired, the exterior of the wall member 202 and/or the impact-attenuating member portions 204a and 204b may include structures that assist with securing to these external elements, such as grooves, extending surfaces, retaining walls, openings, slots, mechanical connectors, and the like. As mentioned above, impact-attenuation members 200 of this type may be provided and used in the manner that foam columns are provided and used in conventional footwear products, such as conventional footwear products available from NIKE, Inc. of Beaverton, Oreg. under the "SHOX" brand trademark.

3. Impact-Attenuation Members Having Alternating Impact-Attenuating Member/Shear Resistant Member Structures FIGS. 3A through 3C illustrate another example impact-attenuation member 300 in accordance with this invention. Like the various example structures described above, this impact-attenuation member 300 includes a shear resistant member 302 and an impact-attenuating member 304, e.g., optionally made from the materials used for shear resistant members 102 and 202 and impact-attenuating members 104, 204a, and 204b, respectively, described above. In this example impact-attenuation member structure 300, the shear resistant member 302 constitutes a plurality of wall slats 302a, e.g., arranged in parallel and vertically or in the direction of expected incident force, e.g., when landing a step or jump. See also FIG. 3B. Similarly, the impact-attenuating member 304 constitutes a plurality of slat members 304a, e.g., arranged in parallel and vertically or in the direction of the expected incident force, e.g., when landing a step or jump. See also FIG. 3C.

While FIGS. 3A through 3C illustrate the shear resistant member 302 and the impact-attenuating member 304 each as a plurality of independent and distinct slat walls 302a or slat members 304a, respectively, this is not a requirement. For example, if desired, at least some of the slat walls 302a could emanate from a common shear resistant member base provided, for example, at the top and/or bottom surfaces of the overall impact-attenuation member structure 300. Additionally or alternatively, if desired, at least some of the slat members 304a could emanate from a common impact-attenuating member base provided, for example, at the top and/or bottom surfaces of the overall impact-attenuation member structure 300. As still another example, if desired, the bases for the shear resistant member 302 and/or the impact-attenuating member 304, when present, may be provided at locations other than the top and/or bottom of the overall impact-attenuation member structure 300 (such as from a base member engaged with the impact-attenuating member side, from a base member extending through a central portion of the column structure, etc.).

The impact-attenuating member 304 and the shear resistant member 302 of this structure may be held together in any desired manner without departing from this invention. For example, cements, adhesives, fusing techniques, and/or mechanical connectors may be used to hold the various elements in place with respect to one another. As another example, if desired (and as illustrated in the example structure of FIG. 6), a restraining element (e.g., made of plastic material) may at least partially fit around and contain the slat walls 302a and slat members 304a.

If desired, as illustrated in FIGS. 3A and 3C, the impact-attenuating slat members 304a may define a central opening 306, e.g., to allow a place for compression, to allow a place for gas escape from the interior of the slat members 304a during compression, to allow room for slat wall 302a movement or deflection during compression, etc.

When mounted in an article of footwear or other foot-receiving device product, impact-attenuation members 300 of the type illustrated in FIG. 3A may be arranged such that the slat wall members 302a extend substantially in a direction from the top to the bottom in the overall footwear structure (e.g., such that the major surfaces of the slat walls 302a run substantially parallel to the vertical direction and/or a direction of expected impact forces 308 and substantially parallel to a side-to-side direction in the footwear structure and/or a direction of expected lateral or shear forces 310 when making at least some stopping, cutting, or direction change actions). Because the slat wall members 302a are substantially parallel to the expected impact force direction in this illustrated example structure 300, these impact-attenuation members 300 may be expected to be somewhat "stiffer" feeling than some of the other structures described above (because no "collapsing" structure is described above). Such a "stiffer" feeling may be desirable for at least some wearers, in at least some situations (e.g., for use in some sporting applications, such as soccer, football, baseball, etc.). Nonetheless, the thickness, overall number, spacing, and/or other features of the slat walls 302a may be controlled and/or selected to provide a desired degree of impact-attenuation with respect to impact forces. Again, the existence of the major surface(s) of the slat walls 302a extending in a direction substantially parallel to an expected direction of a lateral or shear force (e.g., side-to-side) provides excellent stability for the impact-attenuation member 300 against lateral or shear forces.

Of course, other ways for making impact-attenuation member structures 300 of the types illustrated in FIGS. 3A through 3C less "stiff" are possible without departing from this invention. For example, if desired, the slat walls 302a could be provided with "zigzags," "fail" lines, or other pre-bent structures, e.g., as illustrated and/or described above with respect to FIGS. 2A through 2C. As another example, if desired, the slat walls 302a could be curved somewhat, to bias the walls to bend in a predetermined manner and direction. As still another example, the slat walls 302a could be arranged at an angle with respect to the vertical (or expected direction of impact forces), to thereby allow more of a "collapsing" or softer feel. Also, if desired, the slat walls 302a could include portions that slide or otherwise move with respect to one another, to thereby allow more of a "collapsing" or softer feel.

Also, if desired, one or more impact-attenuation members 300 may be attached to one or more external elements, such as base plate structures or other footwear or foot-receiving device member structures, e.g., so as to provide a "heel" unit or "heel cage" that may be incorporated into an article of footwear or other foot-receiving device product. If desired, one or more of the slat walls 302a, the impact-attenuating slat members 304a, and/or other structure associated with the impact-attenuation member 300, such as a restraining member or base member, may include structures that assist with securing to these external elements, such as grooves, extending surfaces, retaining walls, openings, slots, mechanical connectors, and the like. As mentioned above, impact-attenuation members 300 of this type may be provided and used in the manner that foam columns are provided and used in conventional footwear products, such as conventional footwear products available from NIKE, Inc. of Beaverton, Oreg. under the "SHOX" brand trademark.

4. Impact-Attenuation Members Having a Sectioned Impact-Attenuating Member Structure FIGS. 4A through 4D illustrate another example impact-attenuation member 400 in accordance with this invention. This example impact-attenuation member 400 includes a shear resistant member 402 and an impact-attenuating member 404, e.g., optionally made from the materials used for shear resistant members 102, 202, and 302 and impact-attenuating members 104, 204a, 204b, and 304, respectively, described above. In this illustrated example impact-attenuation member structure 400, the shear resistant member 402 includes a central region or "hub" 402a with plural vanes 402b extending from it (e.g., to provide an overall three-dimensional "X" shaped shear resistant member 402 with an open center). The impact-attenuating member 404, on the other hand, constitutes a plurality of independent sections 404a arranged between the vanes 402b of the shear resistant member 402.

Figure 4A:
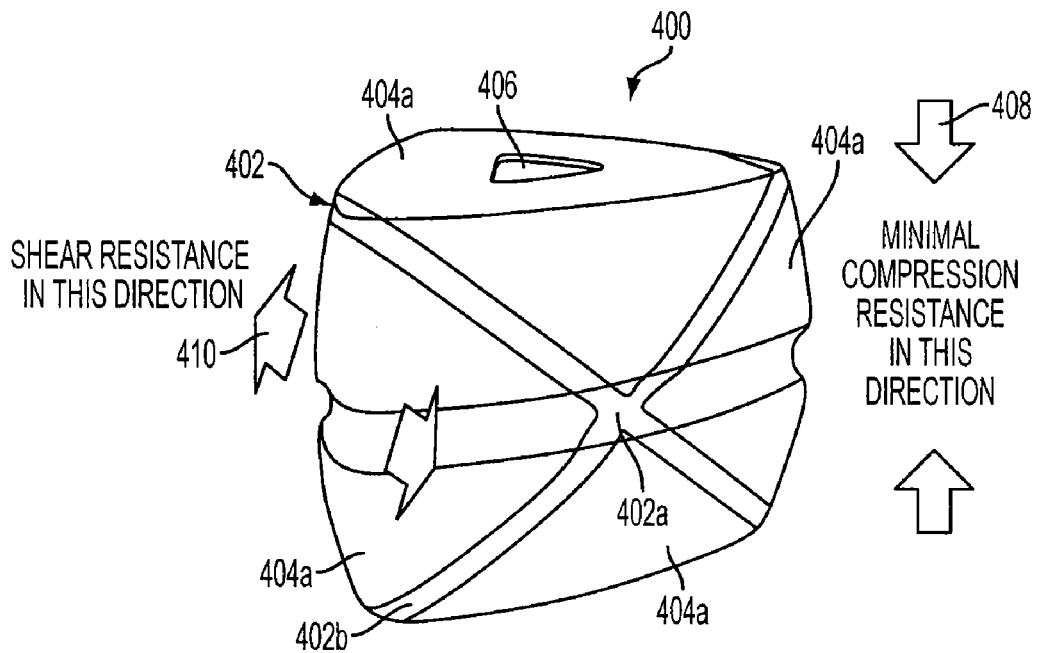
FIGS. 4A through 4D illustrate another example impact-attenuation member structure in accordance with this invention.
Figure 4B:
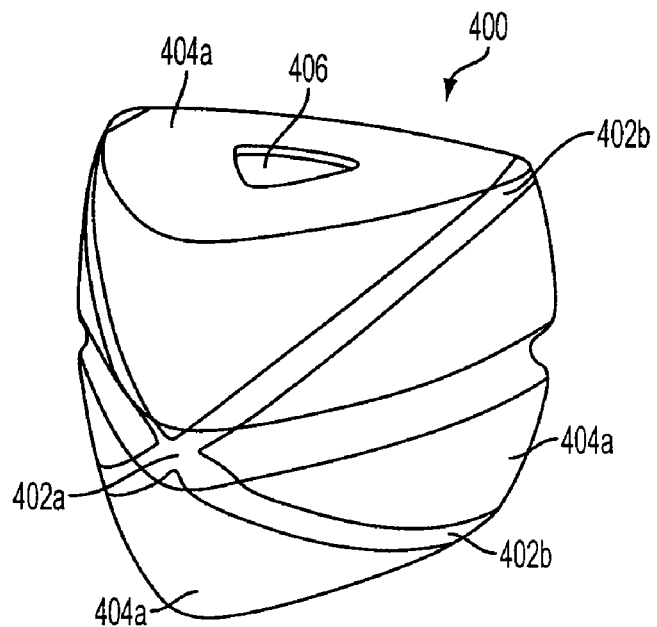
Figure 4C:
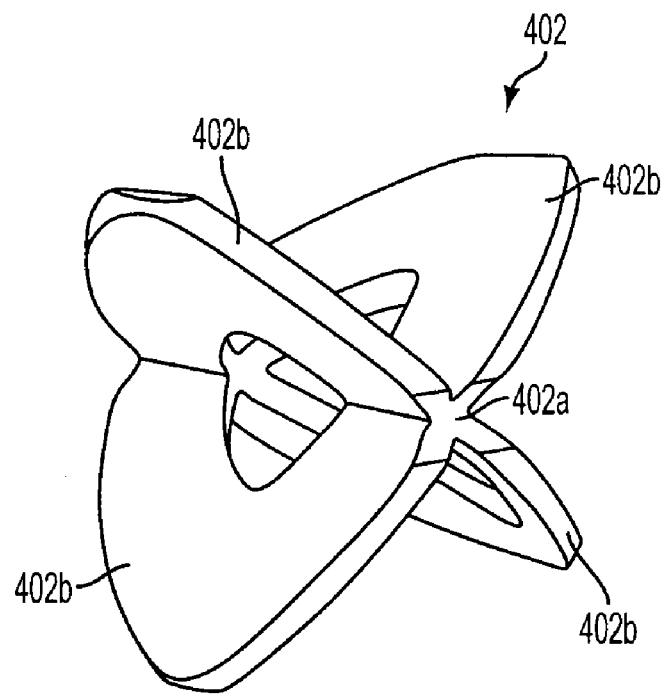
Figure 4D:
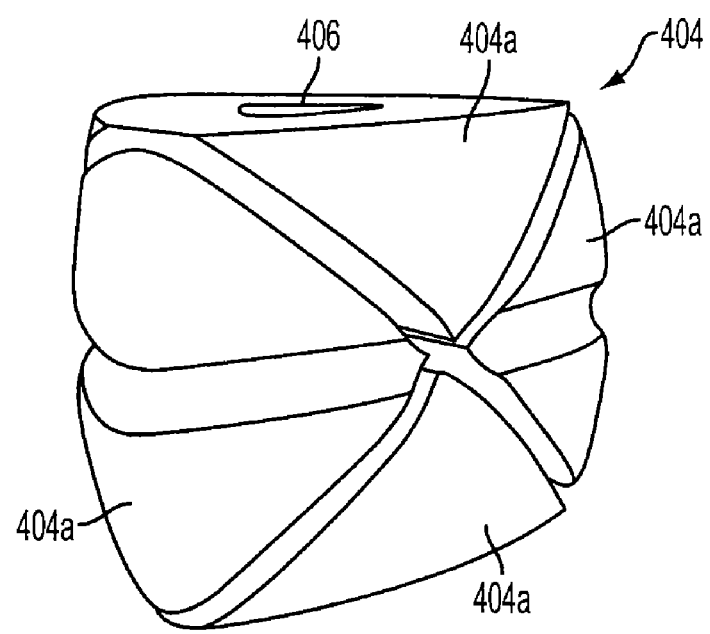

While FIGS. 4A, 4B, and 4D illustrate the impact-attenuating member 404 as a plurality of independent and separate sections 404a, this is not a requirement. For example, if desired, some or all of the sections 404a may be joined together and constitute a single piece. Additionally, while the shear resistant member 402 is shown as a single piece in FIGS. 4A through 4C, it may be made of multiple pieces without departing from this invention. Of course, the impact-attenuating member sections 404a and the shear resistant member 402 of this structure 400 may be held together in any desired manner without departing from this invention. For example, cements, adhesives, fusing techniques, and/or mechanical connectors may be used to hold the various elements in place with respect to one another. As another example, if desired (and as illustrated in the example structure of FIG. 6), a restraining element (e.g., made of plastic material) may at least partially fit around and contain the various parts of the impact-attenuation member 400.

If desired, as illustrated in FIGS. 4A, 4B, and 4D, at least some of the impact-attenuating member sections 404a may define a central opening 406, e.g., to allow a place for compression, to allow a place for gas escape from the interior of the sections 404a during compression, etc. Also, as illustrated in FIG. 4C, the central region 402a of the shear resistant member 402 also may define an open area 402c, to better allow deformation of the shear resistant member 402 under impact forces 408, to allow impact-attenuating member 404 deformation, to allow gas escape, etc.

When mounted in an article of footwear or other foot-receiving device product, impact-attenuation members 400 of the types illustrated in FIGS. 4A through 4D may be arranged such that the vertical or landing direction force extends between arms of the "X" of the shear resistant member 402 and such that the central region 402a and the major surfaces of the vanes 402b extend substantially parallel to a side-to-side direction in the footwear structure and in a direction of expected lateral or shear forces 410 when making stopping, cutting, or direction change actions. The "stiffness" of the overall impact-attenuation member structure 400 may be controlled, for example, by controlling the size of the opening 402c, the thickness, angle, and/or positioning of the vanes 402b, the dimensions of the central region 402a, the number of vanes 402b, the material of the shear resistant member 402, etc. If desired, the shear resistant member 402 may be selected so as to provide minimal or a desired degree of impact-attenuation against impact forces 408, e.g., in a vertical direction or in an impact force incident direction when landing a step or jump. Again, the existence of the central region 402a and the major surface(s) of the vanes 402b extending in a direction substantially parallel to an expected direction of a lateral or shear force provides excellent stability for the impact-attenuation member 400 against lateral or shear forces.

Of course, any number and/or arrangement of vanes 402b may be used without departing from the invention. As some more specific examples, if desired, two vanes 402b may extend from a central region 402a with the central region 402a arranged toward the bottom and/or top of the overall impact-attenuation member structure, e.g., to provide an overall V-shaped and/or inverted V-shaped shear resistant member structure.

Also, if desired, one or more impact-attenuation members 400 may be attached to one or more external elements, such as base plate structures or other footwear or foot-receiving device member structures, e.g., so as to provide a "heel" unit or "heel cage" that may be incorporated into an article of footwear or other foot-receiving device product. If desired, one or more of the vanes 402b and/or the impact-attenuating sections 404a (or other structures associated with the impact-attenuation member 400, such as a restraining member or a base member) may include structures that assist with securing to these external elements, such as grooves, extending surfaces, retaining walls, openings, slots, mechanical connectors, and the like. As mentioned above, impact-attenuation members 400 of this type may be provided and used in the manner that foam columns are provided and used in conventional footwear products, such as conventional footwear products available from NIKE, Inc. of Beaverton, Oreg. under the "SHOX" brand trademark.

Figure 5A:
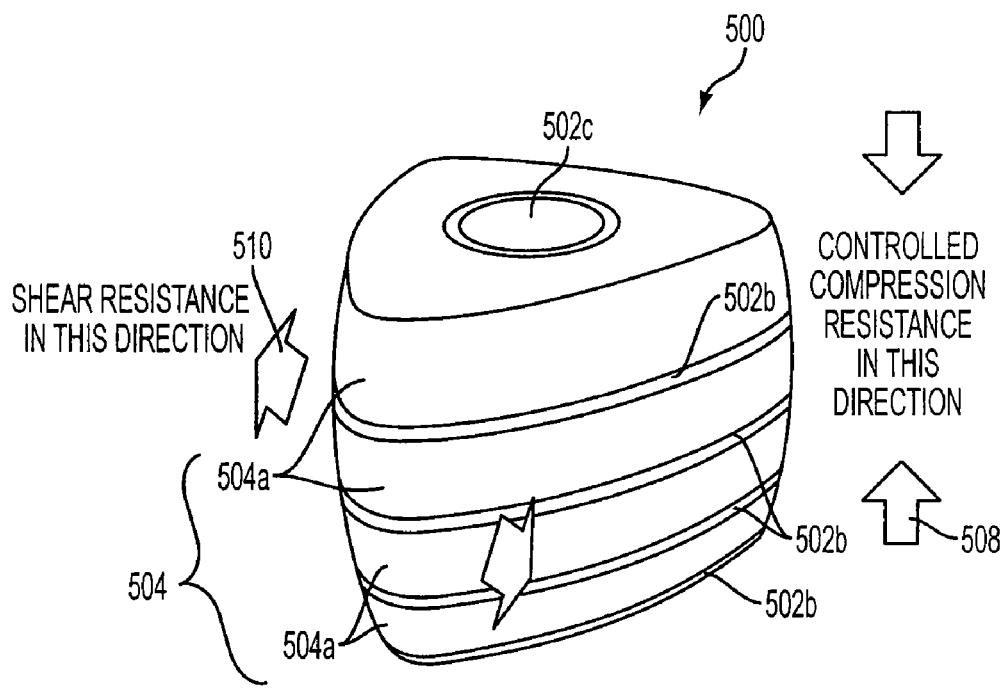
FIGS. 5A and 5B illustrate another example impact-attenuation member structure in accordance with this invention.
Figure 5B:
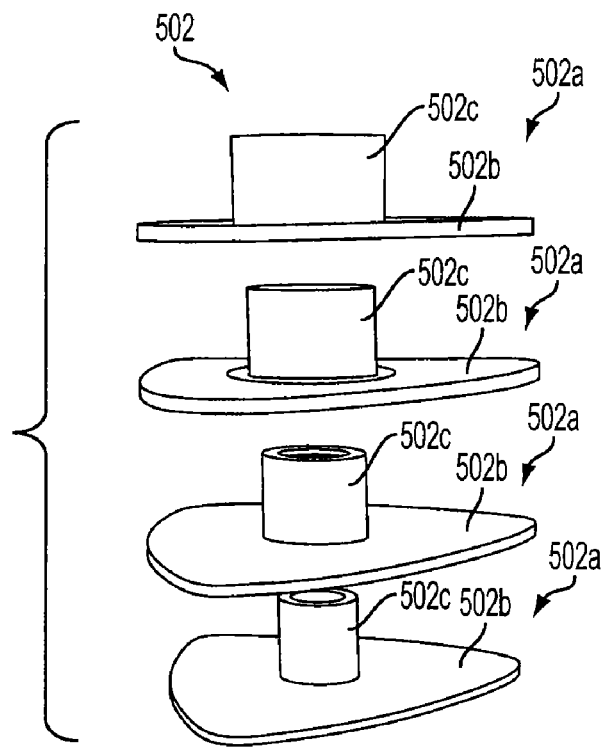

5. Impact-Attenuation Members Having a "Telescoping" Shear Resistant Member Structure Another example impact-attenuation member structure 500 according to this invention is illustrated in FIGS. 5A and 5B. Again, this example structure 500 includes a shear resistant member 502 and an impact-attenuating member 504. In this example structure 500, the shear resistant member 502 includes a plurality of independent portions 502a, and each portion 502a includes a base member 502b and an extending member 502c. Independent sections 504a of the impact-attenuating member 504 are arranged between the portions 502a of the shear resistant member 502. The shear resistant member 502 and the impact-attenuating member 504 may be made, for example, from the materials used for shear resistant members 102, 202, 302, and 402 and impact-attenuating members 104, 204a, 204b, 304, and 404, respectively, described above.

The extending members 502c of the shear resistant member 502 may be sized such that the exterior diameter of one extending member 502c is somewhat smaller than an opening in the base member 502b (and an open interior diameter of the extending member 502c) immediately adjacent to it. In this manner, when compressed against a substantially vertical or other impact force 508 (e.g., when landing a jump or step), the extending members 502c will extend through and slide in the openings in the adjacent neighboring base member 502b and inside its extending member 502c, e.g., in a telescoping manner. If desired, in its uncompressed state, the extending members 502c may extend at least somewhat within its adjacent extending member 502c in a telescoping manner, which helps maintain the desired structural arrangement at all times, whether or not compressing forces 508 act on the overall structure 500. A tight fit in this telescoping manner also can assist in providing lateral stability and resistance to shear or lateral forces 510, as the extending portions 502c will tend to contact one another and provide resistance under lateral or shear force 510. If necessary or desired, lubricating material may be provided to enable easy sliding movement of one extending member 502c with respect to others.

While FIGS. 5A and 5B illustrate the shear resistant member 502 and the impact-attenuating member 504 each as a plurality of independent portions 502a and sections 504a, this is not a requirement. For example, if desired, some or all of the portions 502a and/or sections 504a may be joined together and/or constitute a single piece. Of course, the impact-attenuating member sections 504a and the shear resistant member portions 502a of this structure 500 may be held together in any desired manner without departing from this invention. For example, cements, adhesives, fusing techniques, and/or mechanical connectors may be used to hold the various elements together and in place with respect to one another. As another example, if desired (and as illustrated in the example structure of FIG. 6), a restraining element (e.g., made of plastic material) may at least partially fit around and contain the various parts of the impact-attenuation member 500. The elements of the impact-attenuation member 500 also may be held together by the presence of structural elements in an overall structure (e.g., footwear or other foot-receiving device structure) in which it is mounted.

When mounted in an article of footwear or other foot-receiving device, impact-attenuation members 500 of the types illustrated in FIGS. 5A and 5B may be arranged such that the vertical direction and/or direction of expected impact force 508 extends substantially in the direction of the extending members 502c and such that the major surfaces of the base portions 502b of the shear resistant members 502 extend substantially parallel to a side-to-side direction in the footwear structure and/or in a direction of expected lateral or shear forces 510 when making stopping, cutting, or direction change actions. The "stiffness" of the overall impact-attenuation member structure 500 may be controlled, for example, by controlling the thickness, angle, and/or positioning of the shear resistant portions 502a, the number of shear resistant portions 502a, the materials of the shear resistant portions 502a and impact-attenuating sections 504a, etc. If desired, the shear resistant member 502 may be structured so as to provide minimal or a desired degree of impact-attenuation against impact forces 508, e.g., in a vertical direction or in an incident direction when landing a step or jump. The existence of the base portions 502a (having a major surface extending in a direction substantially parallel to an expected direction of a lateral or shear force 510) and relatively close fitting of the extending portions 502c within one another provide excellent stability for the impact-attenuation member 500 against lateral or shear forces.

Also, if desired, one or more impact-attenuation members 500 may be attached to one or more external elements, such as base plate structures or other footwear or foot-receiving device member structures, e.g., so as to provide a "heel" unit or "heel cage" that may be incorporated into an article of footwear or other foot-receiving device product. If desired, one or more of the shear resistant portions 502a and/or the impact-attenuating sections 504a (or other structure associated with the impact-attenuation member 500, such as a restraining member or base plate) may include structures that assist with securing to these external elements, such as grooves, extending surfaces, retaining walls, openings, slots, mechanical connectors and the like. As mentioned above, impact-attenuation members 500 of this type may be provided and used in the manner that foam columns are provided and used in conventional footwear products, such as conventional footwear products available from NIKE, Inc. of Beaverton, Oreg. under the "SHOX" brand trademark.

6. Shear Resistant Members Also Including Impact-Attenuating Characteristics

The example structures described above include separate shear resistant members and impact-attenuating members in an overall impact-attenuation member structure (although at least some of the shear resistant members also may perform some impact attenuation functions). This feature is not a requirement in all example structures according to this invention. For example, if desired, the impact-attenuating materials may be omitted from the structures of FIGS. 1A through 5B and the resulting structure still may provide impact-attenuation and shear resistance (and lateral stability) characteristics. The features of the shear resistant member may be selected to provide a desired degree of impact attenuation without the need for foam or other impact-attenuating material. Optionally, if desired, a separate impact-attenuating member may be provide separate from and not directly connected to the shear resistant member.

Figure 6:
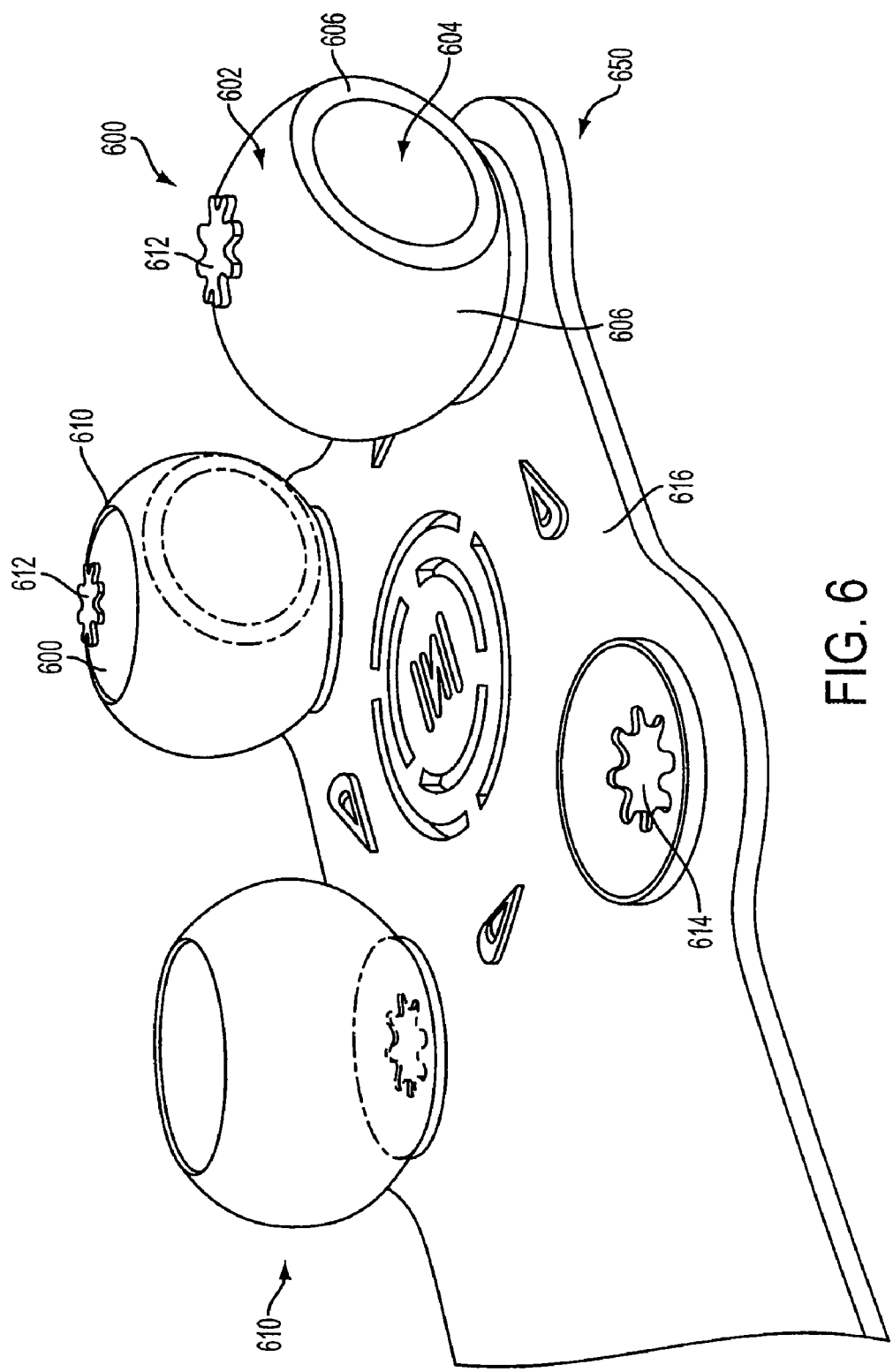
FIG. 6 illustrates another example impact-attenuation member structure in accordance with this invention.

FIG. 6 illustrates another example impact-attenuation member structure 600 in accordance with at least some examples of this invention in which a single structure provides both impact-attenuation characteristics and shear resistance characteristics. In this example structure 600, a shear resistant/impact-attenuating body member 602 is provided, made, for example, of a rigid material, like those described above for shear resistant members 102, 202, 302, 402, and 502. The body member 602 in this illustrated example is a continuous, single structure substantially spheroid or ellipsoid shaped, but two opposing sides of the spheroid or ellipsoid have been removed or truncated. Also, a through hole 604 is defined between the truncated opposing sides (or alternatively, the truncated opposing sides provide access to a hollow interior structure of the spheroid or ellipsoid member). If desired, the hole 604 need not extend completely through the body member 602 (e.g., it may extend from each truncated side wall and stop near the center of the body member).

When mounted in an article of footwear, the structure 600 may provide both impact-attenuating and shear resistance properties. More specifically, because of the open structure (e.g., including through hole 604 in this illustrated example), the rigid material of the body member 602 may flex somewhat in response to vertical forces and/or forces experienced when landing a step or jump. Additionally, because of the wide opposing wall structures 606 present in the footwear side-toside direction, lateral stability and resistance to lateral or shear forces are provided (e.g., to provide stability when a wearer quickly stops, cuts, or changes directions in the shoe).

Various other example features of structures in accordance with this invention are illustrated in FIG. 6. While these features are described and discussed above in conjunction with the example structure 600 illustrated in FIG. 6, those skilled in the art will appreciate that some or all of these various features also may be used in conjunction with other impact-attenuation member structures without departing from this invention, including, for example, the various structures described above in conjunction with FIGS. 1A through 5B.

FIG. 6 illustrates that the overall impact-attenuation member further may include a restraining member 610 that surrounds or at least partially surrounds the body member 602. In this example device, the restraining member 610 may be spheroid, ellipsoid, cylindrical, or ring-shaped and configured such that it entirely covers and contains the openings 604 but leaves the wall member 602 exposed at its top and/or bottom. This restraining element 610 may be made from a flexible or somewhat flexible polymeric material, e.g., a urethane material or other material flexible under application of force (e.g., in the substantially vertical direction and/or from landing a step and/or jump), but returns to substantially its original shape and orientation when the force is sufficiently relaxed or relieved.

Restraining elements 610, in at least some examples of the invention, potentially may perform several functions. First, in at least some examples, the restraining element 610 may help prevent mud, dirt, or other debris or foreign material from entering the through hole 604 of the wall member 602 and potentially weighing down or damaging the device. Additionally, the restraining element 610 may attenuate some of the compressive force to which the impact-attenuation device 600 is exposed during use, which can help alleviate stress and/or strain on the impact-attenuation member 600. As another example, if desired, restraining element 610 may function as a stopper to prevent the impact-attenuation member 600 from excessively deforming in some directions under the applied compressive force (which again can help alleviate stress and/or strain on the impact-attenuation member 600). As still another example, portions of the restraining element 610 side walls may exert an inward force on the impact-attenuation member 600, thereby helping to return the impact-attenuation member 600 to its original orientation (or back to substantially its original orientation). Such spring back action, in at least some instances, can help improve the wearer's performance by providing a reflexive force to help recover from the exerted compressive force.

Of course, the restraining element 610 can take on any size, configuration, arrangement, or orientation without departing from the invention. For example, the restraining element 610 need not completely cover the openings 604. Additionally or alternatively, the restraining element 610 may fit somewhat loosely around the outside of the body member 602 when no compressive force is applied to the device 600 and then stop or help slow the flexure of the body member 602 and/or compression of impact-attenuation member 600 when the force is applied. As another alternative, the restraining element 610 may fit rather tightly around the outside of the impact-attenuation member 600 when no compressive force is applied to the member 600 to provide a stiffer overall impact-attenuation member. Additionally, the restraining element 610 need not completely surround the impact-attenuation member 600 (e.g., gaps, openings, or the like may be provided, the restraining element 610 may be C-shaped, etc., without departing from the invention). As still another potential alternative, the restraining element 610 may be made from more than one individual piece without departing from the invention (e.g., the restraining element 610 may constitute two or more C-shaped pieces that can clip around the impact-attenuation member 600).

FIG. 6 illustrates still additional potential features of impact-attenuation member structures in accordance with this invention. As illustrated, the body member 602 includes retaining elements 612 at its top and bottom surfaces that can be used to help mount the body member 602 to another device. The retaining elements 612 may engage with appropriately shaped openings, recesses, or grooves 614 provided in another device (such as a base plate member 616 for a heel unit for an article of footwear) to help hold the body member 602 in place with respect to the other device. Of course, any size, number, shape, and/or orientation of retaining elements 612 and corresponding openings, recesses, or grooves 614 may be used without departing from this invention. As another alternative, if desired, the body member 602 may include the opening(s), groove(s), or recess(es) 614 and the other device (e.g., base plate 616) may include the projecting retaining elements 612. As still another alternative, if desired, each of the body member 602 and the other device may include a combination of openings 614 and retaining structures 612 that fit into corresponding complementary structures 612 or openings 614 provided in the mating device. Of course, additional ways of engaging the body member 602 with another device (such as a base plate 616) may be used without departing from this invention, such as adhesives or cements; fusing techniques; mechanical connectors; and the like. Such additional ways may be used in place of or in combination with the retaining element 612/opening 614 structures described above.

Also, if desired, the impact-attenuation member 600 of FIG. 6 may be used in combination with a separate impact-attenuating member, e.g., made of materials like those described above for elements 104, 204a, 204b, 304, 404, and 504. The impact-attenuating member, when present, may be included inside opening 604, around the wall member 602, and/or separate from and optionally not directly connected to wall member 602, without departing from this invention.

Also, if desired, one or more impact-attenuation members 600 may be attached to one or more external elements, such as base plate structures 616 or other footwear or foot-receiving device members, e.g., so as to provide a "heel" unit or "heel cage" 650 that may be incorporated into an article of footwear or other foot-receiving device product. Of course, any number of impact-attenuation members 600 may be included in the overall structure without departing from the invention, in any desired arrangement or orientation, and not each impact-attenuation member in a given heel unit 650 need have the same or similar structures. Also, while a single base plate structure 616 is shown in FIG. 6 (located at the bottom of the structure 650), those skilled in the art will appreciate that an upper plate member also may be included without departing from this invention. As mentioned above, impact-attenuation members 600 of this type may be provided and used in the manner that foam columns are provided and used in conventional footwear products, such as conventional footwear products available from NIKE, Inc. of Beaverton, Oreg. under the "SHOX" brand trademark.

7. Footwear Structures

As described above, impact-attenuation members of the various types described above may be incorporated into footwear structures and other foot-receiving device products.

FIG. 7 illustrates an example footwear product 700 in which shear resistant impact-attenuation members in accordance with examples of this invention (e.g., members 100, 200, 300, 400, 500, and/or 600) are mounted. The article of footwear, which may be an article of athletic footwear, includes an upper member 702 and a sole structure 704 engaged with the upper member 702. The sole structure 704 may be engaged with the upper member 702 in any desired manner, including in conventional manners known and used in the art, such as by adhesives or cements; fusing techniques; mechanical connectors; stitching or sewing; and the like. Also, the upper member 702 and sole structure 704 may be made of any desired materials in any desired constructions, including with conventional materials and conventional constructions as are known and used in the art, including, for example, the conventional materials and constructions used for conventional footwear products available from NIKE, Inc. of Beaverton, Oreg. While the example structure 700 of FIG. 7 illustrates the impact-attenuation members 100, 200, 300, 400, 500, 600 in the heel area of an article of footwear 700, those skilled in the art will appreciate that such members may be included at any desired location(s) in a footwear 700 or foot-receiving device structure, including, for example, in the forefoot portion. Also, any number, arrangement, and/or style of impact-attenuation members 100, 200, 300, 400, 500, 600 may be included in a footwear structure without departing from this invention, including combinations of different types of impact-attenuation members.

Also, while the illustrated footwear structure 700 shows the impact-attenuation members 100, 200, 300, 400, 500, 600 open and exposed, those skilled in the art will recognize, of course, that the impact-attenuation members 100, 200, 300, 400, 500, 600 may be covered (e.g., embedded within a midsole or other portion of the sole or foot-supporting structure, enclosed in a gas-filled bladder (e.g., an air-filled bladder), which also may perform impact-attenuating functions, etc., without departing from this invention.

8. Other Potential Features and Constructions

Of course, the above description and the various structures illustrated and discussed above merely constitute examples of structures and features in accordance with this invention. A wide variety of modifications, changes, and/or alternative structures and combination of features are possible without departing from this invention. One additional example of a potential modification to the various examples described above relates to the materials for the shear resistant member. As described above, in at least some examples of this invention, the shear resistant material may be enclosed within or encompassed by the impact-attenuating foam (or other) material. As another example, if desired, the shear resistant material may be provided in the form of fibers embedded within the impact-attenuating material and oriented in the shear direction (e.g., oriented a horizontal, lateral side-to-medial side direction in a footwear structure) to inhibit shear (e.g., maintain lateral stability against shear forces) while still allowing vertical collapse or deflection. As still another example, if desired, carbon fiber (or other fiber) composites may be used as the shear resistant member (e.g., with the carbon fibers oriented in the shear direction (e.g., a horizontal, lateral side-to-medial side direction in a footwear structure) to inhibit shear (e.g., maintain lateral stability against shear forces) while still allowing vertical collapse or deflection). Other materials also may be used for the shear resistant member and/or the impact-attenuating member without departing from the invention.

E. Conclusion

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

The invention claimed is:

1. An impact-attenuation member, comprising:
  an impact-attenuating member; and
  a shear resistant member engaged with the impact-attenuating member and formed as a box structure including a first wall, a second wall opposite the first wall, a third wall extending from the first wall to the second wall, and a fourth wall opposite the third wall and extending from the first wall to the second wall, the shear resistant member, the impact-attenuating member being positioned in the box structure;
  wherein the shear resistant member allows bending or compression against impact forces in a first direction and is stable against shear forces in a second direction different from the first direction, and only a single impact-attenuating member is positioned in the box structure.

2. An impact-attenuation member according to claim 1, wherein at least two opposing sides of the box structure are open.

3. An impact-attenuation member according to claim 1, wherein the impact-attenuating member engages a retaining structure provided in one wall of the shear resistant member to thereby hold the impact-attenuating member in place with respect to the shear resistant member.

4. An impact-attenuation member according to claim 1, wherein a first surface of the impact-attenuating member engages a first retaining structure provided in a first wall of the shear resistant member and a second surface of the impact-attenuating member engages a second retaining structure provided in a second wall of the shear resistant member, wherein the second wall is opposite the first wall.

5. An impact-attenuation member according to claim 1, wherein the shear resistant member and the impact-attenuating member cooperate to provide a controlled degree of compression in the substantially vertical direction.

6. An impact-attenuation member according to claim 1, wherein the presence of the shear resistant member allows the impact-attenuation member to withstand at least a 25% greater shear force without roll-over or collapse as compared to the impact-attenuating member alone.

7. An article of footwear comprising:
  an upper member; and
  a sole member engaged with the upper member, wherein the sole member includes an impact-attenuation member comprising:
    an impact-attenuating member; and
      a shear resistant member engaged with the impact-attenuating member and formed as a box structure including a first wall, a second wall opposite the first wall, a third wall extending from the first wall to the second wall, and a fourth wall opposite the third wall and extending from the first wall to the second wall, the shear resistant member, the impact-attenuating member being positioned in the box structure;
    wherein the shear resistant member allows bending or compression against impact forces in a substantially vertical direction and is stable against shear forces in a substantially lateral direction, and only a single impact-attenuating member is positioned in the box structure.

8. An article of footwear according to claim 7, wherein at least two opposing sides of the box structure are open.

9. An article of footwear according to claim 7, wherein the impact-attenuating member engages a retaining structure provided in one wall of the shear resistant member to thereby hold the impact-attenuating member in place with respect to the shear resistant member.

10. An article of footwear according to claim 7, wherein a first surface of the impact-attenuating member engages a first retaining structure provided in a first wall of the shear resistant member and a second surface of the impact-attenuating member engages a second retaining structure provided in a second wall of the shear resistant member, wherein the second wall is opposite the first wall.

11. An article of footwear according to claim 7, wherein the shear resistant member and the impact-attenuating member cooperate to provide a controlled degree of compression in the substantially vertical direction.

12. An article of footwear according to claim 7, wherein the presence of the shear resistant member allows the impact-attenuation member to withstand at least a 25% greater shear force without roll-over or collapse as compared to the impact-attenuating member alone.

13. An article of footwear according to claim 7, wherein the presence of the shear resistant member allows the impact-attenuation member to withstand at least a 50% greater shear force without roll-over or collapse as compared to the impact-attenuating member alone.

14. An article of footwear according to claim 7, wherein the presence of the shear resistant member allows the impact-attenuation member to withstand at least a 50% greater shear force without roll-over or collapse as compared to the impact-attenuating member alone.

* * * * *

UNITED STATES PATENT AND TRADEMARK OFFICE
CERTIFICATE OF CORRECTION

PATENT NO. : 8,322,048 B2
APPLICATION NO. : 12/825942
DATED : December 4, 2012
INVENTOR(S) : Aveni et al.

It is certified that error appears in the above-identified patent and that said Letters Patent is hereby corrected as shown below:

Column 22, lines 17-18, replace "wall, the shear resistant member, the" with --wall, the--.

Column 22, lines 62-63, replace "wall, the shear resistant member, the" with --wall, the--.

Signed and Sealed this
Fifth Day of February, 2013

Teresa Stanek Rea
*Acting Director of the United States Patent and Trademark Office*